(12) United States Patent
Kim

(10) Patent No.: US 7,936,382 B2
(45) Date of Patent: May 3, 2011

(54) IMAGE PICKUP DEVICE, PROJECTOR INCLUDING THE IMAGE PICKUP DEVICE, AND IMAGE PICKUP METHOD

(75) Inventor: Dae Woo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1070 days.

(21) Appl. No.: 11/727,815

(22) Filed: Mar. 28, 2007

(65) Prior Publication Data

US 2007/0229679 A1      Oct. 4, 2007

(30) Foreign Application Priority Data

Mar. 29, 2006   (KR) ........................ 10-2006-0028374

(51) Int. Cl.
*H04N 5/262* (2006.01)
(52) U.S. Cl. ....................................................... 348/239
(58) Field of Classification Search ............. 348/207.99, 348/239, 744
See application file for complete search history.

(56) References Cited

U.S. PATENT DOCUMENTS

| | | | |
|---|---|---|---|
| 6,441,850 B1 * | 8/2002 | Dotsubo et al. | 348/239 |
| 6,621,524 B1 * | 9/2003 | Iijima et al. | 348/584 |
| 6,987,535 B1 * | 1/2006 | Matsugu et al. | 348/239 |

* cited by examiner

*Primary Examiner* — Tuan Ho
(74) *Attorney, Agent, or Firm* — Ked & Associates LLP

(57) ABSTRACT

An image pickup device is provided. The image pickup device includes a pickup device that captures an image, a background image processor that determines a pickup object area to be captured to be an illumination image and displays the pickup object area as a background image, a display that displays the background image, and a main controller that generates a control signal that controls the pickup device, the background image processor, and the display. The image pickup device projects the illumination image instead of the background image on the screen, such that the person's image does not overlap with the background image during the image pickup action. A brightness level of the object image in the corrected pickup picture is adjusted according to a brightness level of the background image, such that the object image can be more naturally harmonized with the background image.

6 Claims, 6 Drawing Sheets

IMAGE PICKUP DEVICE, PROJECTOR INCLUDING THE IMAGE PICKUP DEVICE, AND IMAGE PICKUP METHOD

This application claims the benefit of Korean Patent Application No. 10-2006-0028374, filed on Mar. 29, 2006, which is hereby incorporated by reference as if fully set forth herein.

BACKGROUND OF THE INVENTION

1. Field of the Invention

The present invention relates to an image pickup device, a projector including the image pickup device, and an image pickup method.

2. Discussion of the Related Art

Typically, a projector has been widely used to project a desired image on a screen. With the increasing development of the projector, the number of functions contained in the projector is rapidly increasing.

For example, there has recently been developed a projector capable of capturing an image using a pickup element mounted to the projector itself, and projecting the captured image on a screen.

While the projector projects the image on the screen, a user can capture his or her figure using an image pickup object image mounted to the projector itself. In other words, the image pickup device inserts a desired background image into a background part of a user to be captured using an image pickup function, such that it can take a picture of the user.

However, in the case of capturing a picture according to the conventional method, a target object image (i.e., a pickup object image) and a background image are overlapped with each other, because the image is captured by the image pickup device on the condition that the background image is projected on the target object.

In conclusion, in the case of capturing an image of the target object using the projector including the above-mentioned conventional image pickup method, the background image overlaps with the pickup object image, such that an effective/clear pickup object image cannot be implemented.

SUMMARY OF THE INVENTION

Accordingly, the present invention is directed to an image pickup device, a projector including the image pickup device, and an image pickup method that substantially obviate one or more problems due to limitations and disadvantages of the related art.

An object of the present invention is to provide an image pickup device, a projector including the image pickup device, and an image pickup method, which can effectively insert a desired background image into a background image of a target object without overlapping with the target-object background image, resulting in the implementation of a natural resultant image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image pickup device comprises: a pickup unit for capturing an image; a background image processor for determining a pickup object area to be captured to be an illumination image, and displaying the pickup object area as a background image; a display for displaying the background image; and a main controller for generating a control signal capable of controlling the pickup unit, the background image processor, and the display.

Preferably, the image pickup device further comprises: a first storage unit for storing a plurality of background images; and a background image selector for selecting at least one of the stored background images according to a selection signal of a user, and outputting the selected background image serving as a background image to the background image processor.

In another aspect of the present invention, there is provide a projector comprising: a background image processor for filling a pickup object part from among a background image with an illumination image, and outputting a background image in which the illumination image is filled, as a pickup background image; and a pickup unit for capturing the pickup background image and an image of an object.

In yet another aspect of the present invention, there is provide an image pickup method of a projector comprising: a) filling a pickup object part from among a background image with an illumination image, and outputting a background image in which the illumination image is filled, as a pickup background image; and b) capturing the pickup background image and an image of an object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
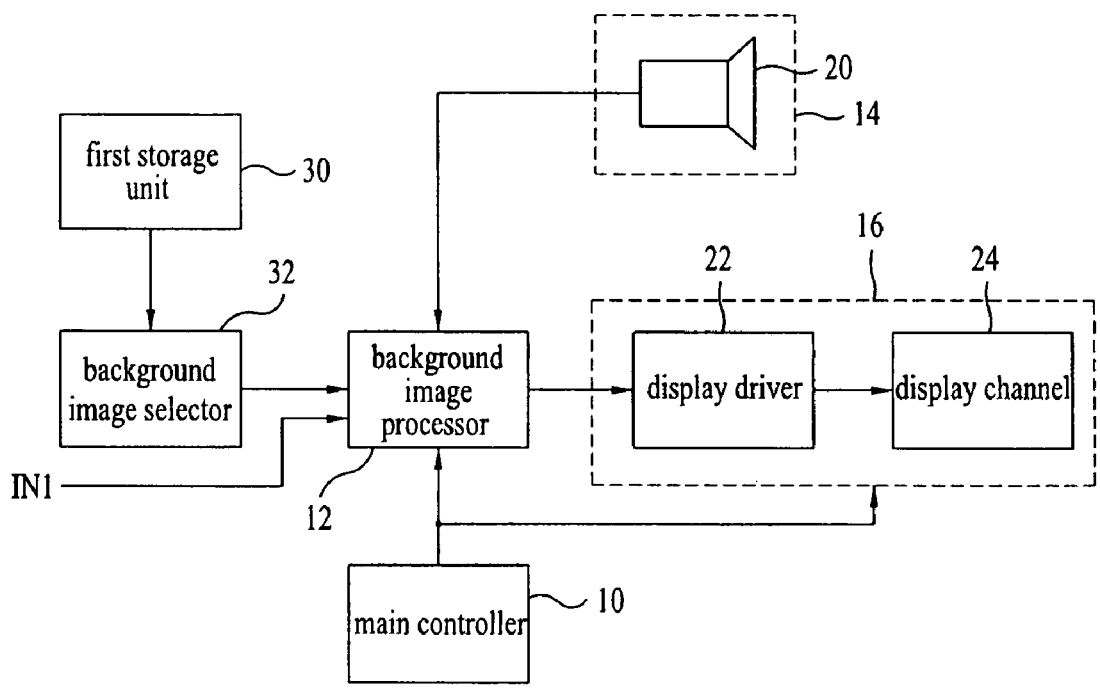
FIG. 1 is a block diagram illustrating an image pickup device according to a preferred embodiment of the present invention.

FIG. 1 is a block diagram illustrating an image pickup device according to a preferred embodiment of the present invention.

Referring to FIG. 1, the image pickup device according to the present invention includes a first storage unit 30, a background image selector 32, a main controller 10, a background image processor 12, a pickup unit 14, and a display 16.

The pickup unit 14 outputs pickup image data of a current projection screen to the background image processor 12.

The background image processor 12 processes image data in which a pickup object area is set to an illumination image according to the output image data of the pickup unit 14, and outputs the processed result as a background image.

The display 16 projects the output background image on a screen (not shown), and displays it on the screen.

The main controller 10 outputs a control signal for controlling the above-mentioned constituent components.

In this case, the image pickup device may further include a first storage unit 30 and a background image selector 32. The first storage unit 30 stores a plurality of background images. The background image selector 32 selects at least one of the stored background images according to a selection signal of a user, and outputs the selected background image serving as a background image to the background image processor.

The background image processor 12 may include an internal pattern generator 40, an image mixing unit 42, an auxiliary controller 44, and a second storage unit 46.

The internal pattern generator 40 generates the illumination image capable of distinguishing the pickup object area and a background image area. The image mixing unit 42 mixes the background image and the generated illumination image according to a selection signal, and outputs the mixed resultant image as a pickup background image. The second storage unit 46 employs the background image in which the pickup object area is displayed as the background image area as a pickup background image, and stores the resultant image. The auxiliary controller 44 separates the pickup object area from the background image, and outputs the separated result as the selection signal.

In this case, the image mixing unit 42 includes a switching unit 60. The switching unit 60 is switched by the selection signal, selects at least one of the background image and another background image from which the pickup object area is separated, and outputs the selected background image.

The internal pattern generator 40 generates a first illumination image for indicating the background image area and a second illumination image for indicating the pickup object image. The first illumination image is a white screen for distinguishing the screen from the object (i.e., pickup object) to be captured. The second illumination image enables only the pickup object image to be a white image so as to distinguish the pickup object image from the background image.

The auxiliary controller 44 generates the selection signal capable of determining a white-image area to be the background image area according to the generated illumination image, and determining the remaining area(s) other than the white-image area to be pickup object area.

In this case, the second storage unit 46 stores a screen image formed when the background image and the pickup object image are simultaneously captured. In this case, if a dynamic range of the background image is different from that of the pickup object image, the pickup object image may not be harmonized with the background image.

In order to solve the above-mentioned problems, the auxiliary controller 44 calculates dynamic ranges of R-, G-. B-colors of a specific image area from among the stored screen image. In this case, the specific image area includes pixels of the background image and pixels of the pickup object image.

Therefore, if the background image area is different from the pickup object image area, the auxiliary controller 44 adjusts brightness values of R-, G-, and B-signals of the illumination image of the pickup object.

For this purpose, the auxiliary controller 44 calculates a dynamic range of the resultant image stored in the second storage unit, and adjusts a difference in brightness between the pickup object image and the background image.

A projector including the image pickup device according to a preferred embodiment of the present invention will hereinafter be described with reference to the annexed drawings.

FIG. 1 is a block diagram illustrating a projector including an image pickup device according to a preferred embodiment of the present invention.

Referring to FIG. 1, the projector including the image pickup device according to the present invention includes a first storage unit 30, a background image selector 32, a main controller 10, a background image processor 12, a pickup unit 14, and a display 16.

The background image processor 12 fills a pickup object part from among a background image with an illumination image, and outputs a background image (acting as a pickup background image) in which the illumination image is filled to the display 16.

In this case, the display 16 displays a pickup background image received from the background image processor 12 on the screen (not shown). For this purpose, the display may include a display driver 22 and a display panel 24. In this case, the display driver 22 drives the display panel 24 according to the pickup background image, and the display panel 24 projects the pickup background image on the screen.

In this way, if the pickup background image is projected on the screen and the background image is projected on the screen, the illumination image instead of the background image is projected on the screen. In this case, the illumination image serves as the illumination for the target object. In other words, the illumination image is used for the illumination of the object, and the background image is not projected on the object.

According to a preferred embodiment of the present invention, although the illumination image may be a white image, it should be noted that the scope of the present invention is not limited to only the white image, and can be applied to other examples as necessary. In other words, the illumination image may be set to other-colored images different from the white image.

According to a preferred embodiment of the present invention, the background image to be captured along with the target object is received from an external part via an input terminal IN1.

According to another preferred embodiment of the present invention, the background image to be captured along with the target object can be selected by the user. For this purpose, the projector of FIG. 1 according to the present invention may further include a first storage unit 30 and a background image selector 32 as necessary.

In this case, the first storage unit 30 includes a plurality of background images. The background image selector 32 selects at least one of the stored background images according to a selection signal of a user, and outputting the selected background image to the background image processor 12.

Figure 2:
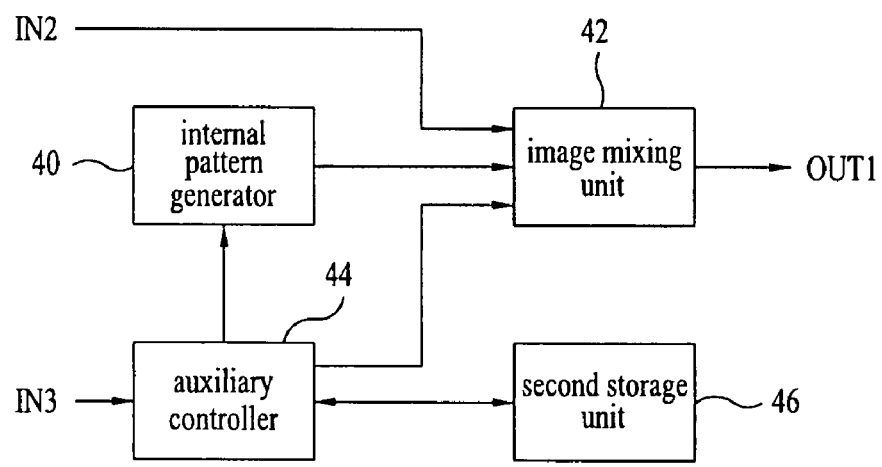
FIG. 2 is a block diagram illustrating a background image processor of FIG. 1 according to a preferred embodiment of the present invention.

FIG. 2 is a block diagram illustrating a background image processor of FIG. 1 according to a preferred embodiment of the present invention.

Referring to FIG. 2, the background image processor 12 includes an internal pattern generator 40, an image mixing unit 42, an auxiliary controller 44, and a second storage unit 46.

The internal pattern generator 40 generates the illumination image upon receiving a control signal from the controller 10, and outputs the illumination image to the image mixing unit 42.

The image mixing unit 42 receives the background image from the input terminal IN2 and receives the illumination image from the internal pattern generator 40, mixes the background image and the illumination image according to the selection signal (S) received from the auxiliary controller 44, and outputs the mixed result to the display 16 via the output terminal OUT1.

For this purpose, the auxiliary controller 44 analyzes the pickup object part of the background image, and outputs the analyzed result indicative of the selection signal (S) to the image mixing unit 42.

Figure 3:
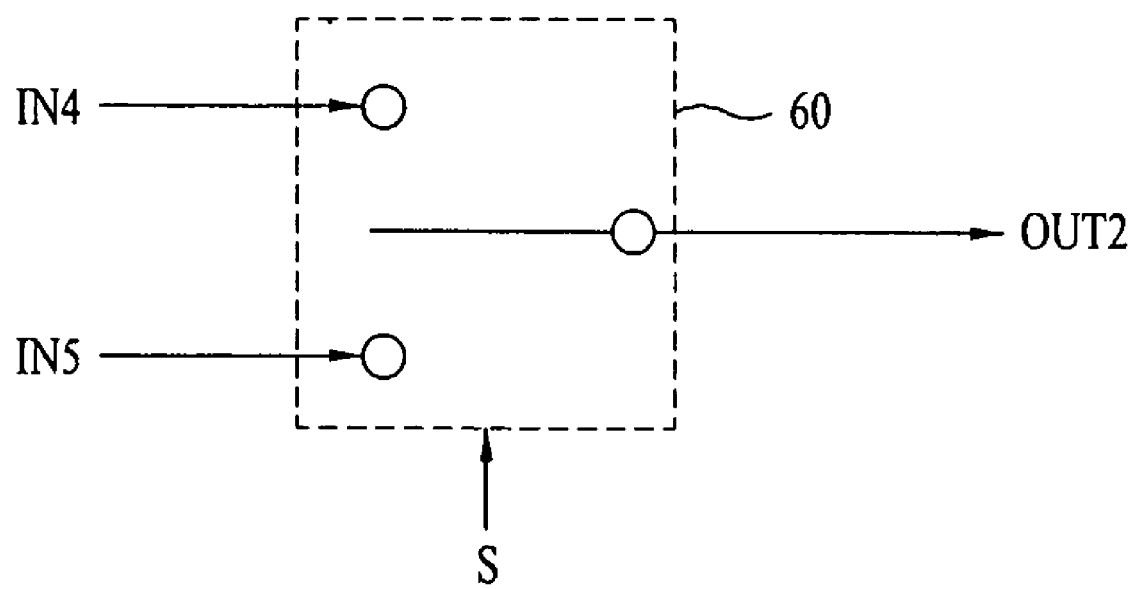
FIG. 3 is a circuit diagram illustrating an image mixing unit of FIG. 2 according to a preferred embodiment of the present invention.

FIG. 3 is a circuit diagram illustrating an image mixing unit of FIG. 2 according to a preferred embodiment of the present invention.

Referring to FIG. 3, the switching unit 60 is switched by the selection signal (S) received from the auxiliary controller 44, selectively mixes the background image received from the input terminal IN4 or the illumination image received from the input terminal IN5, and outputs the mixed result acting as the pickup background image to the display 16 via the output terminal OUT2.

For example, the pickup background image may be created in pixel units. In this case, the auxiliary controller 44 analyzes or determines whether each pixel of the background image belongs to the pickup object part. If it is determined that each pixel of the background image does not belong to the pickup object part, the auxiliary controller 44 outputs the analyzed result acting as the selection signal (S) to the image mixing unit 42.

In this case, if any pixel of the image to be projected on the screen belongs to the pickup object part, the switching unit 60 selects the illumination image received via the input terminal IN5 according to the selection signal (S), and outputs the selected illumination image via the output terminal OUT2.

However, if any pixel of the image to be projected on the screen does not belong to the pickup object part and belongs to the background part, the switching unit 60 selects the background image received via the input terminal IN4, and outputs the selected background image via the output terminal OUT2.

In this way, the switching unit 60 switches the background image or the illumination image in pixel units according to information of an area to which the pixel belongs, and outputs the switched result. Therefore, output pixels are gathered, such that an overall pickup background image is configured.

As a result, the pickup object part of the pickup background image is assigned to the illumination image (e.g., a white image), such that the illumination image indicative of the white image is projected on the screen. The background part in which a background image will be positioned can be projected on the screen as a background image.

A pickup object part is referred to as an object area, and a background area of the object is referred to as a background area (also called a screen area).

In the meantime, in order to create the pickup background image, there is a need for the background image processor 12 to recognize which part of the image to be projected on the screen is set to the object area, and which part of the image is set to the background area.

For this purpose, the auxiliary controller 44 controls the internal pattern generator 40, and outputs the illumination image to the display 16 via the image mixing unit 42. Therefore, the pickup unit 14 of FIG. 1 captures the illumination image along with the object, instead of the background image.

In this case, the pickup unit 14 may be implemented with a camera 20 for capturing an image. In this case, the auxiliary controller 44 receives the resultant image formed when the illumination image instead of the background image is used as a background of the object, from the pickup unit 14 via the input terminal IN3.

If the background image processor 12 of FIG. 1 further includes the second storage unit 46, the auxiliary controller 44 stores the pickup resultant image received from the input terminal IN3 in the second storage unit 46.

As stated above, not only the illumination image instead of the background image but also the object image are simultaneously captured and stored, such that the pickup object part can be easily distinguished from the background image. In other words, the auxiliary controller 44 determines the illumination image from among the resultant image stored in the second storage unit 46 to be the background area, determines the remaining parts other than the illumination image to be the object area, and outputs the determined result as the selection signal (S).

The pickup unit 14 captures the pickup background image displayed on the screen and the object image, and the outputs the captured resultant image to the background image processor 12.

The main controller 10 of FIG. 1 controls the background image processor 12 and the display 16.

The image pickup device according to the present invention can enable the pickup background image to be naturally harmonized with the captured result of the object.

For this purpose, the auxiliary controller 44 receive the resultant image acquired when the pickup background image and the object image are simultaneously captured from the pickup unit 14 via the input terminal IN3, and stores the received resultant image in the second storage unit 46. In this case, the resultant image formed when the pickup background image and the object image are simultaneously captured is called an object background picture.

In this case, the auxiliary controller 44 adjusts a difference in brightness between the object image and the background image of the object background picture stored in the second storage unit 44. The auxiliary controller 44 calculates dynamic ranges of R-, G-, and B-colors of the object in the object background picture, and calculates dynamic ranges of brightness for each color (R, G, and B) of the object background picture.

In this case, if the calculated brightness dynamic range of the object is different from that of the background image, the auxiliary controller 44 adjusts the brightness of the object so as to reduce the difference in brightness dynamic range between the background image and the object image.

In this case, the image corrected by the auxiliary controller 44 is stored in the second storage unit 46, and is applied to the display 16 via the auxiliary controller 44 and the image mixing unit 42, such that the resultant image can be projected on the screen. Therefore, the user can re-correct a desired image according to his or her desire.

An image pickup method of the projector according to the present invention will hereinafter be described with reference to the annexed drawings.

Figure 4:
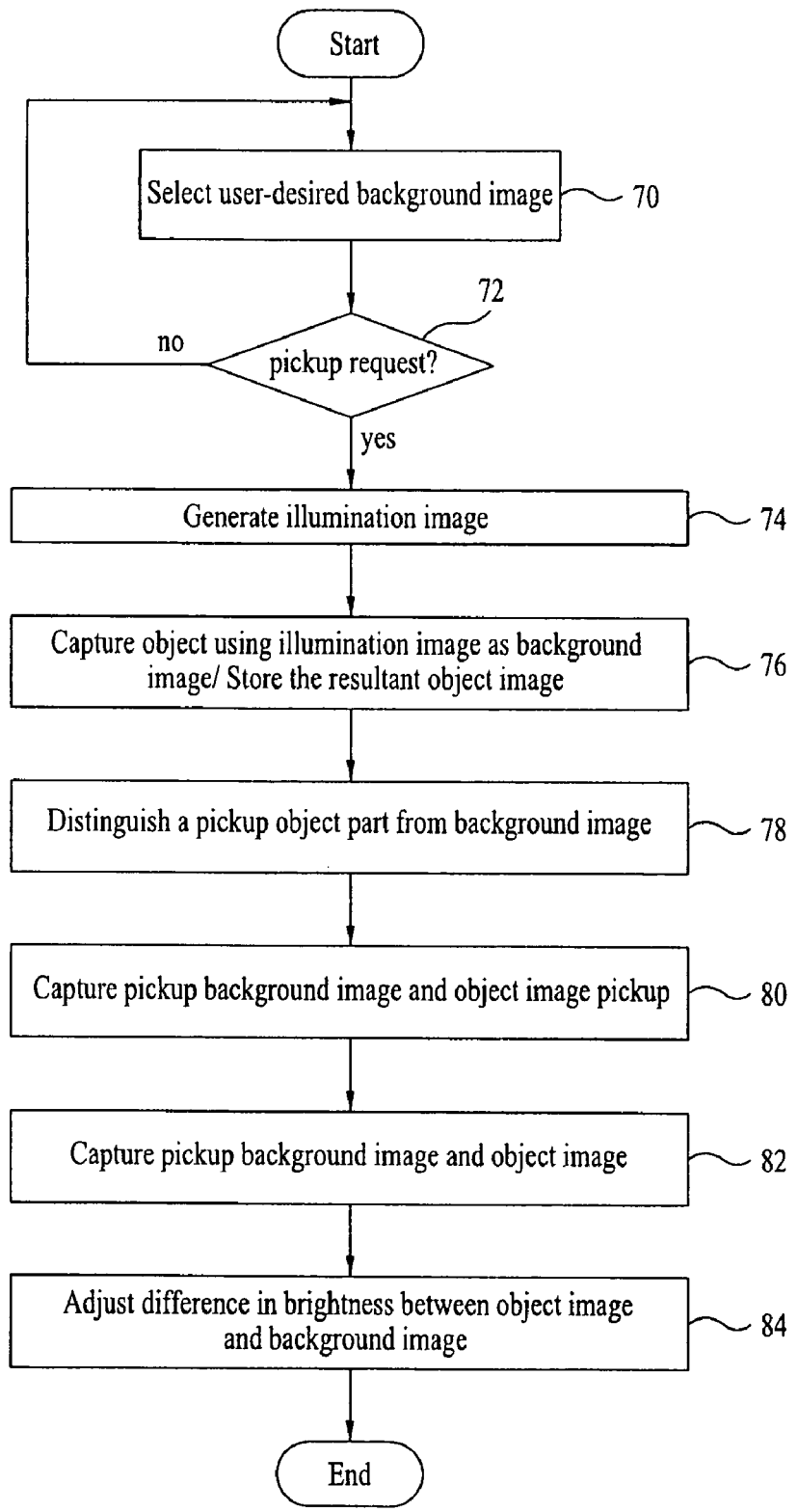
FIG. 4 is a flow chart illustrating an image pickup method of a projector according to a preferred embodiment of the present invention.

FIG. 4 is a flow chart illustrating an image pickup method of a projector according to a preferred embodiment of the present invention.

Referring to FIG. 4, the image pickup method includes a first stage (i.e., Steps 70~80) for determining the pickup background image, a second stage (i.e., Step 82) for simultaneously capturing the pickup background image and the object image, and a third stage (i.e., Step 84) for correcting the captured result.

The image pickup method of the projector fills a pickup object part of the background image with the illumination image, fills the background part with a background image, fills the object area with the illumination image, and determines the resultant image as a pickup background image at steps 70~80.

For the convenience of description and better understanding of the image pickup method of FIG. 4, it is assumed that the image pickup method is executed by the projector of FIG. 1, however, it should be noted that the scope of the present invention is not limited to the above-mentioned example.

As can be seen from FIG. 4, the user selects a desired background image at step S70. For this purpose, the first storage unit 30 stores a plurality of background images, and the background image selector 32 can select a user-desired background image from among several background images stored in the first storage unit 30.

Thereafter, the main controller 10 determines whether an image pickup action is requested by the user at step 72. If the user desires to capture an image of the object, the user may press a pickup button (not shown) as necessary, and the main controller 10 detects whether the pickup button is pressed or not, such that the main controller 10 can recognize the presence or absence of the user's pickup request signal.

If it is determined that the image pickup request is not requested by the user, the operation of the image pickup method goes to step 70.

However, if the presence of the user's pickup request signal is determined, the main controller 10 controls the background image processor 12 to generate the illumination image at step 74. In this case, the illumination image is generated from the background image processor 12, such that it is projected on the screen via the display 16.

After performing the step 74, the pickup unit 14 captures an image of the object that uses the illumination image as a background, and stores the captured resultant image in the second storage unit 46 via the auxiliary controller 44 of FIG. 2 at step 76.

After performing the step 76, the auxiliary controller 44 distinguishes the pickup object part from the resultant image stored in the second storage unit 46 at step 78.

In other words, the resultant image stored in the second storage unit 46 is acquired when the object is captured using the illumination image as a background.

Therefore, if the brightness of the stored resultant image is equal to the brightness of the illumination image, the auxiliary controller 44 determines a corresponding to be the illumination image. Otherwise, if the brightness of the stored resultant image is different from that of the illumination image, the auxiliary controller 44 determines a corresponding area to be the object area.

After performing the step 78, the object area acting as the pickup object area is filled with the illumination image, and the remaining area other than the object area is filled with the background image, such that the pickup background image is created at step 80.

For this purpose, the auxiliary controller 44 outputs the resultant image in which the object area and the background area are distinguished from each other to the image mixing unit 42 according to the selection signal (S).

The image mixing unit 42 selects a background image at the background area by replying to the selection signal (S), outputs the selected background image, and outputs the illumination image at the object area.

After performing the step 80, the pickup unit 14 captures the pickup background image and the object image at step 82. The pickup result of step S82 can be stored in the second storage unit 46 via the auxiliary controller 44 of FIG. 2.

After performing the step S82, the auxiliary controller 44 adjusts a difference in brightness between the object image and the background image in the captured image stored in the second storage unit 46 at step S84. In this case, the brightness-difference adjustment result may be transmitted to the display 16 via the image mixing unit 42, such that it can be re-projected on the screen as necessary.

For the convenience of description, provided that the object is a person or user and the background image is a white image, the projector of FIG. 1, the background image processor 12 of FIG. 1, and the image processing method of FIG. 4 will hereinafter be described in detail.

FIGS. 5A~5E are conceptual diagrams illustrating a projector and an image pickup method using the projector according to the present invention.

Figure 5A:
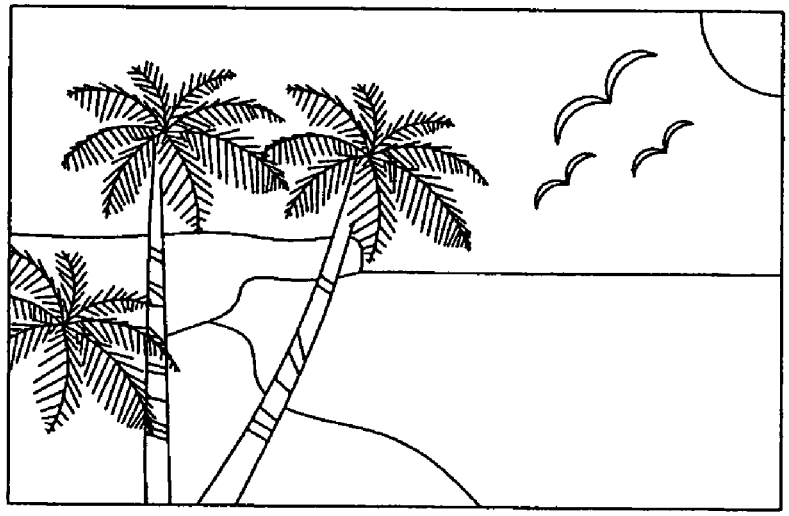
FIGS. 5A~5E are conceptual diagrams illustrating a projector and an image pickup method using the projector according to the present invention.

Referring to FIGS. 5A~5E, it is assumed that the user selects the background image of FIG. 5A using the first storage unit 30 and the background image selector 32.

The main controller 10 determines whether the user desires to capture an image of a desired object at step 72.

If it is determined that the user desires to capture the image of the object at step 72, the main controller 10 controls the background image processor 12 to display the white image on the display 16 using the background image processor 12. Therefore, the white image is projected on the screen, instead of the background image.

In this case, the auxiliary controller 44 of the background image processor 12 receives a control signal from the main controller 10 via the input terminal IN3, controls the internal pattern generator to output the white image, and controls the image mixing unit 42 to output the white image generated from the internal pattern generator 40 via the output terminal OUT1.

The pickup unit 14 captures an image of the object on the condition that the white image instead of the background image has been set to a background, and stores the captured object image at step 76.

Figure 5B:
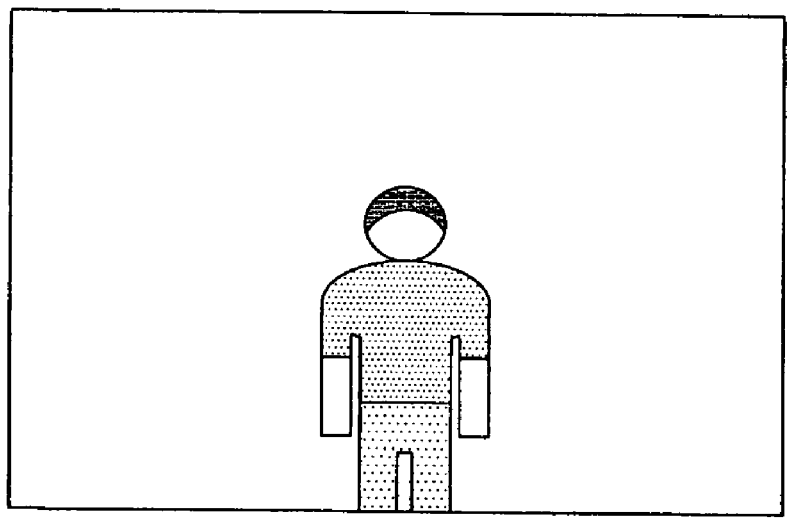

In this case, the image shown in FIG. 5B is captured by the pickup unit 14, and is then stored in the background image processor 12. For this purpose, the auxiliary controller 44 stores the image of FIG. 5B received from the pickup unit 14 via the input terminal IN3 in the second storage unit 46.

The background image processor 12 discriminates between an object area indicative of a pickup object part of the background image and other background images at step 78.

For this purpose, the auxiliary controller 44 determines the white image from among the image of FIG. 5B stored in the second storage unit 46 to be a background area, and determines the remaining areas to be an object area.

For example, the auxiliary controller 44 may divide the image of FIG. 5B into a white image and a black image. In this case, the black area corresponds to the background image 90, and the white area corresponds to the object area 92.

Figure 5C:
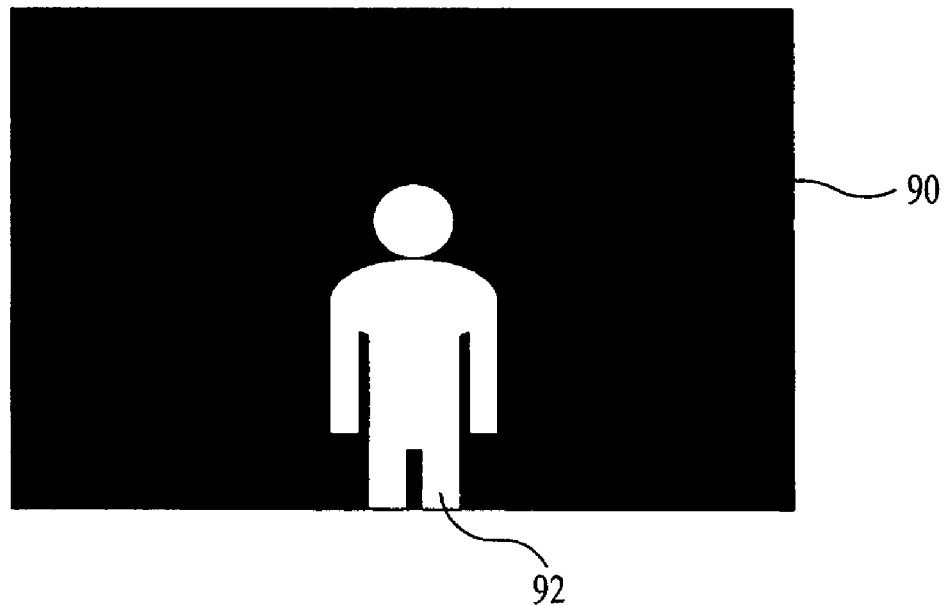
Figure 5D:
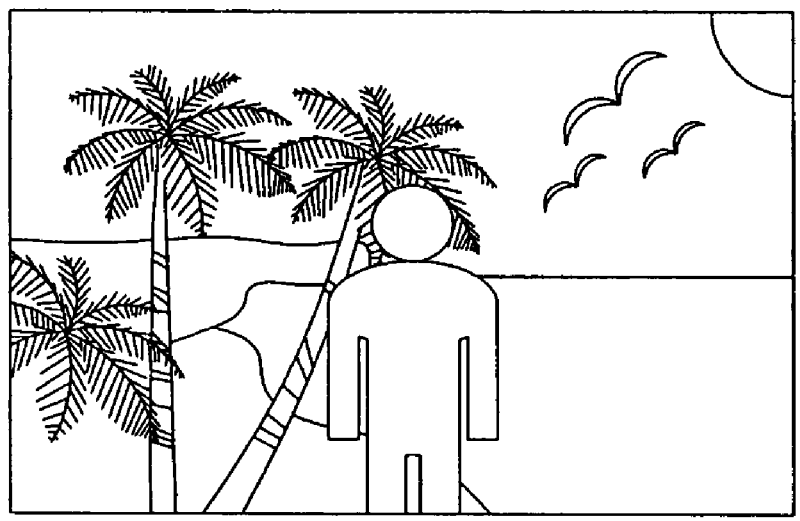

The background image processor 12 fills the object area acting as the pickup object part with the white image, determines the image of FIG. 5D having the filled background image to be a pickup background image, and outputs the image of FIG. 5D to the display 16 at step 80.

For this purpose, the auxiliary controller 44 of FIG. 2 uses the area-discriminated result as shown in FIG. 5C. In the case of the object area, the white image is generated from the image mixing unit 42, and is then outputted via the output terminal OUT1. In the case of the background image, the background image is generated from the image mixing unit 42, and is then outputted via the output terminal OUT1.

Figure 5E:
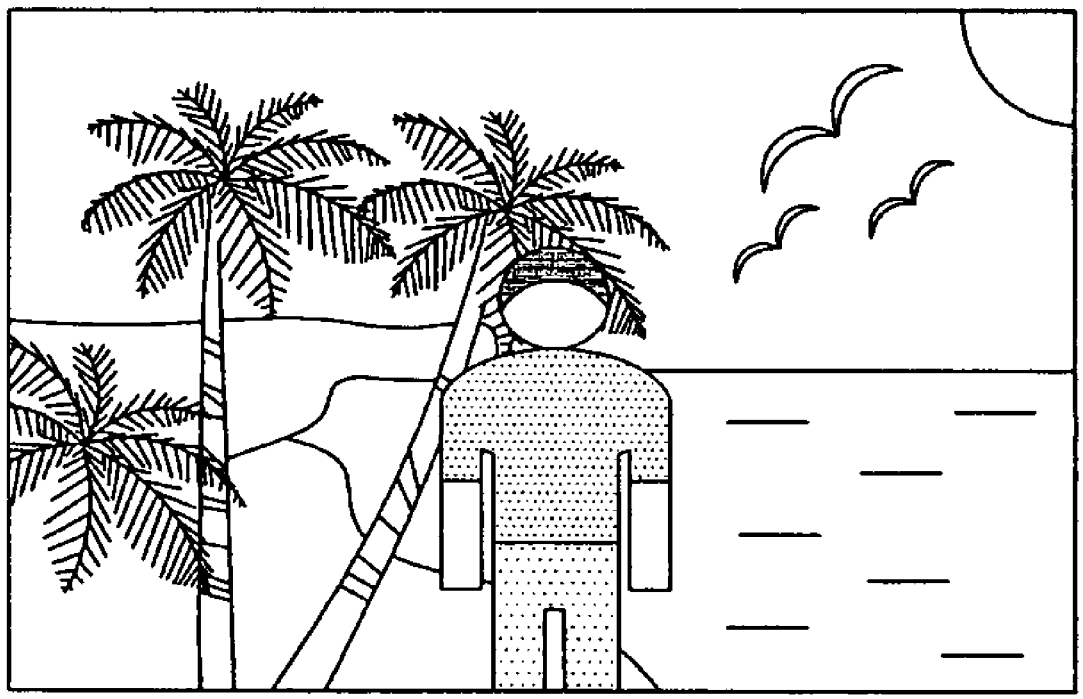

The pickup unit 14 captures an image of the user or person on the condition that the pickup background image of FIG. 5D has been projected on the screen, and stores the resultant image of FIG. 5E in the background image processor 12 at step 82. For this purpose, the auxiliary controller 44 stores the image of FIG. 5E received from the pickup unit 14 via the input terminal IN3 in the second storage unit 46.

The auxiliary controller 144 reads the image of FIG. 5E from the second storage unit 46, and corrects a difference in brightness between the person's image and the background image as described above.

As apparent from the above description, the image pickup device and the projector including the same according to the present invention projects the illumination image (e.g., the white image) instead of the background image on the screen, such that the person's image does not overlap with the background image during the image pickup action.

A brightness level of the object image in the corrected pickup picture is adjusted according to a brightness level of the background image, such that the object image can be more naturally harmonized with the background image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image pickup device, comprising:
   a pickup device that captures an image;
   a background image processor that determines a pickup object area to be captured to be an illumination image, and displays the pickup object area as a background image;
   a display that displays the background image; and
   a main controller that generates a control signal that controls the pickup device, the background image processor, and the display, wherein the background image processor comprises:
   an internal pattern generator that generates the illumination image that distinguishes the pickup object area and a background image area;
   an image mixing device that mixes the background image and the generated illumination image according to a selection signal and outputs the mixed resultant image as a pickup background image;
   a second storage device that employs the background image in which the pickup object area is displayed as the background image area as the pickup background image, and stores the resultant image; and
   an auxiliary controller that separates the pickup object area from the background image, and outputs the separated result as the selection signal.

2. The image pickup device according to claim 1, further comprising:
   a first storage device that stores a plurality of background images; and
   a background image selector that selects at least one of the stored plurality of background images according to the selection signal, and outputs the selected background image serving as the background image to the background image processor.

3. The image pickup device according to claim 1, wherein the image mixing device comprises:
   a switching device that is switched by the selection signal, selects at least one of a plurality of background images and another background image from which the pickup object area is separated, and outputs the selected background image.

4. The image pickup device according to claim 1, wherein the internal pattern generator generates a first illumination image that indicates the background image area and a second illumination image that indicates a pickup object image.

5. The image pickup device according to claim 1, wherein the auxiliary controller generates the selection signal that determines a white-image area to be the background image area according to the generated illumination image, and determines remaining area other than the white-image area to be the pickup object area.

6. The image pickup device according to claim 1, wherein:
   the second storage device stores the resultant image formed when the background image and the pickup object image are simultaneously captured, and the auxiliary controller calculates a dynamic range of the resultant image stored in the second storage device, and adjusts a difference in brightness between the pickup object image and the background image.

* * * * *